(12) United States Patent
Huang et al.

(10) Patent No.: US 11,030,072 B2
(45) Date of Patent: Jun. 8, 2021

(54) CREATING AND STARTING FAST-START CONTAINER IMAGES

(71) Applicant: International Business Machines Corporation, Armonk, NY (US)

(72) Inventors: Hai Huang, Scarsdale, NY (US); Jia Jun Brandon Lum, White Plains, NY (US); Alaa Youssef, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 16/177,555

(22) Filed: Nov. 1, 2018

(65) Prior Publication Data

US 2020/0142801 A1 May 7, 2020

(51) Int. Cl.
| | |
|---|---|
| *G06F 11/36* | (2006.01) |
| *G06F 11/34* | (2006.01) |
| *G06F 9/455* | (2018.01) |
| *G06F 9/50* | (2006.01) |
| *G06F 9/48* | (2006.01) |

(52) U.S. Cl.
CPC ...... *G06F 11/3414* (2013.01); *G06F 9/45508* (2013.01); *G06F 9/45558* (2013.01); *G06F 9/4806* (2013.01); *G06F 9/505* (2013.01); *G06F 11/3612* (2013.01); *G06F 9/4862* (2013.01); *G06F 11/3604* (2013.01); *G06F 11/3668* (2013.01)

(58) Field of Classification Search
CPC ...... G06F 9/4806; G06F 9/4843; G06F 9/485; G06F 9/4856; G06F 9/4862; G06F 11/3604; G06F 11/3612; G06F 11/3616; G06F 11/3664; G06F 11/3668; G06F 11/3672; G06F 11/3696
See application file for complete search history.

(56) References Cited

U.S. PATENT DOCUMENTS

| | | | |
|---|---|---|---|
| 5,940,871 A | 8/1999 | Goyal et al. | |
| 9,047,411 B1 * | 6/2015 | Bienkowski | ........ G06F 11/3664 |
| 9,710,368 B1 * | 7/2017 | Gundeti | ............ G06F 11/3692 |
| 10,114,686 B2 * | 10/2018 | Barr | ..................... G06F 11/079 |
| 10,318,400 B2 * | 6/2019 | Goel | ................... G06F 11/3466 |

(Continued)

OTHER PUBLICATIONS

Katharina Gschwind et al. "Optimizing Service Delivery with Minimal Runtimes." Retrieved from Internet using: http://www.icsoc.spilab.es/wp-content/uploads/2017/10/Optimizing-Service-Delivery-with-Minimal-Runtimes.pdf,4 pages.

(Continued)

*Primary Examiner* — Joseph O Schell
(74) *Attorney, Agent, or Firm* — Cantor Colburn LLP; Abdy Raissinia

(57) ABSTRACT

Aspects of the invention include creating and starting fast-start container images. A preview image of a container is received at a host computer. The preview image includes a subset of an original image of the container. The preview image of the container is executed, at the host computer, for a workload. Based at least in part on detecting a fault during the executing of the preview image of the container, one of the original image of the container and a portion of the original image not included in the preview image of the container is accessed for continuing execution of the workload.

14 Claims, 8 Drawing Sheets

(56) References Cited

U.S. PATENT DOCUMENTS

| | | | | |
|---|---|---|---|---|
| 10,459,822 B1* | 10/2019 | Gondi | .................. | G06F 8/75 |
| 10,572,245 B1* | 2/2020 | Doebel | .................. | G06F 8/20 |
| 2010/0312865 A1* | 12/2010 | Criddle | .................. | G06F 8/65 |
| | | | | 709/221 |
| 2014/0047342 A1* | 2/2014 | Breternitz | ............ | G06F 9/5061 |
| | | | | 715/735 |
| 2014/0136516 A1* | 5/2014 | Clifford | ............ | G06F 11/3419 |
| | | | | 707/719 |
| 2018/0025160 A1* | 1/2018 | Hwang | .................. | G06F 8/71 |
| | | | | 726/25 |
| 2018/0095973 A1 | 4/2018 | Huang et al. | | |
| 2019/0065323 A1* | 2/2019 | Dhamdhere | ........ | G06F 11/1451 |

OTHER PUBLICATIONS

Lian Du, et al., "Cider: A Rapid Docker Container Deployment System through Sharing Network Storage," IEEE 19th International Conference on High Performance Computing and Communications; IEEE 15th International Conference on Smart City; IEEE 3rd International Conference on Data Science and Systems (HPCC/SmartCity/DSS), Year: 2017, pp. 332-339.

Vaibhav Rastogi, et al. "Cimplifier: automatically debloating containers," ESEC/FSE 2017 Proceedings of the 2017 11th Joint Meeting on Foundations of Software Engineering, pp. 476-486.

Vaibhav Rastogi, et al., "New Directions for Container Debloating," Proceedings of the 2017 Workshop on Forming an Ecosystem Around Software Transformation, pp. 51-56. ACM, 2017.

* cited by examiner

CREATING AND STARTING FAST-START CONTAINER IMAGES

BACKGROUND

The present invention generally relates to container images for executing workloads on host computers, and more specifically, to creating and starting fast-start container images.

Containers isolate an application and its dependencies into a self-contained unit that can be moved from one computing environment to another. A container includes an entire runtime environment, including an application and all of its dependencies, libraries and other binaries, as well as configuration files needed to run the application, all bundled into one package. Prior to using a container to execute a workload on a host computer, an image of the container with the entire runtime environment is downloaded to the host computer. A typical image of a container includes a list of files that can be any combinations of one or more executable files, one or more configuration files, and/or one or more data files. The container is started on the host computer by executing the image of the container at the host computer. The executing of the image at the host computer causes the workload to be executed at the host computer. The time that it takes to start a container on a host computer is largely dependent on the amount of time that it takes to download the image of the container.

SUMMARY

According to one or more embodiments of the present invention, computer-implemented methods are provided for creating and starting fast-start container images. A non-limiting example computer-implemented method includes receiving, at a host computer, a preview image of a container. The preview image includes a subset of an original image of the container. The preview image of the container is executed, at the host computer, for a workload. Based at least in part on detecting a fault during the executing of the preview image of the container, one of the original image of the container and a portion of the original image not included in the preview image of the container is accessed for continuing execution of the workload.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
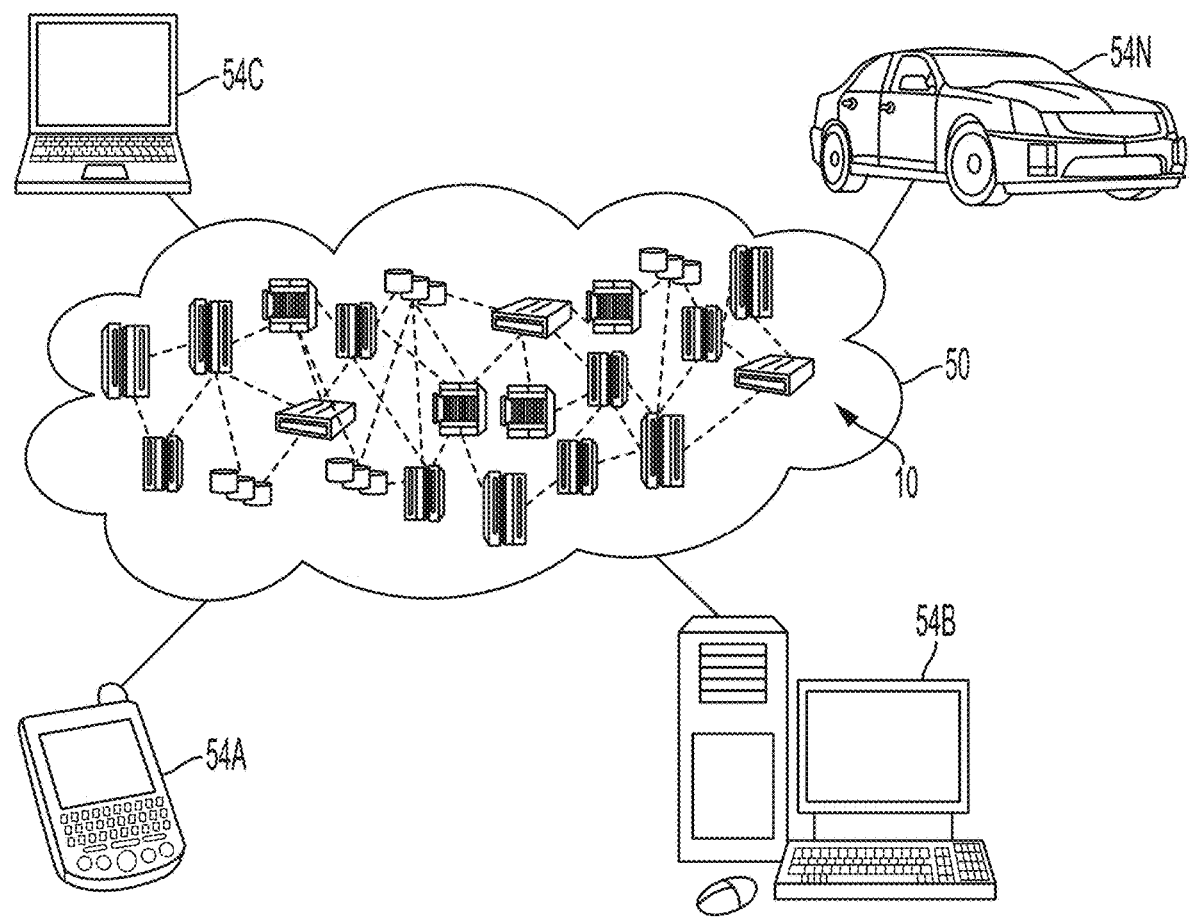
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention create and start fast-start container images. One or more embodiments of the present invention utilize a preview image of a container, which is typically a fraction of the size of its corresponding original image, to provide a container for executing a workload. When a preview image for a container exists and the original image of the container is not locally cached on a host computer, the container is executed on the host computer using the preview image. Due at least in part to the preview image of the container being smaller in size than the original image of the container, the container can be download and started more quickly using the preview image than when using the original image. In the meantime, the original image or at least a portion of the original image not included in the preview image can be downloaded to the host computer in the background while the preview image is executing the workload. In the case that the preview image is not sufficient for what is needed to execute the workload (i.e. a fault condition is detected), the container can be aborted by container runtime code executing at the host computer and restarted using the preview image and the missing portion of the original image, or using the entire original image. This fault handling can be performed without interrupting or halting the executing workload on the host computer. In the case where a fault is detected in the preview image, by the time that the fault is detected the missing portion of the original image may be already stored on the host computer, resulting in no additional overhead other than a container restart.

In accordance with one or more embodiments of the present invention, given a container image, or original image, to run an arbitrary workload, the original image is minimized to create a preview image that is a preview version of the container image. The preview image is typically much smaller in size than the original image. For example, the preview image may in some cases be as small as five or ten percent of the size of the original image.

As used herein, the terms "fast-start container image" and "preview image" are used interchangeably to refer to a subset of the original image that provides basic or incomplete functionality (relative to the original image) and that can be executed at the host computer. Each preview image is associated with an original image and an original image may be associated with one or more preview images, to support for example different host computer configurations or different types of workload. In accordance with one or more embodiments of the present invention, the images are stored in a repository that is accessible by the host computer, and container runtime code located on the host computer pulls the preview image of the container first (if available) and executes it. The host computer can also choose to download the original image of the container or at least a portion of the original image not included in the preview image in a background task. As used herein, the terms "background task" or "background mode" refer to processing by the container runtime that does not interfere with the running container processing, and is initiated at the discretion of the container runtime code, or system. If the execution of the preview image results in a fault condition, the original image or at least a portion of the original image not included in the preview image can be used to execute the workload.

Containers are contrasted with virtualization where the package that is passed to a node, or host computer, is a virtual machine (VM) which includes an entire operating system (OS) as well as the application. In general, containers provide a way to virtualize an OS so that multiple workloads can run on a single OS instance, and in VMs it is the hardware that is being virtualized to run multiple OS instances. For example, a physical server, or node, running three VMs typically has a hypervisor and three separate OSs running on top of it. By contrast, a server running three containerized applications runs a single OS and each container shares the OS kernel with the other containers. Shared parts of the OS are read only, while each container has its own mount (i.e., a way to access the container) for writing. Thus, containers are typically more lightweight and use fewer resources than VMs. A benefit to using containers instead of VMs is that a container is smaller in size and therefore a single server can host more containers than VMs. Another benefit to using containers instead of VMs is that with each move to a different server, the VM needs to boot up the OS, while containers can be moved in and out quickly because they use the OS already executing on the node.

One or more embodiments of the present invention provide technological improvements over current methods for expediting the starting of container images on host computers. Current approaches, such as the Slacker architecture, require a shared network file system (NFS) environment, which is restrictive to a particular local computing environment. Example embodiments of the present invention provide technical solutions to the above noted disadvantage of existing solutions by operating in any network environment that supports containers. Contemporary approaches also transfer all of the data blocks in a container image in on-demand manner and in an uncompressed format. A disadvantage of contemporary approaches is the performance impact on the workload execution until all of the blocks making up the container image are cached. Example embodiments of the present invention provide technical solutions to the above noted disadvantages of existing solutions by starting the execution of a workload using a small subset of the container image. This allows the container to start more quickly because it doesn't have to wait for the entire container image to be downloaded to the host machine. In addition, by allowing the downloading of the rest of the container image to be performed in a background mode, the downloading of the whole container image does not impact the performance of the workload executing on the subset of the container image.

One or more embodiments of the present invention provide technological improvements over current methods for expediting the starting of container images on host computers. Current approaches, such as the docker-slim approach, require the use of training data to determine the portion of a container image that is not used by an application. The training data is generated by running the application multiple times and performing a static analysis of the files accessed by the application. The files not accessed by the application during the training runs are removed from the container image and the "slimmed down" version of the container image is used to execute a workload on a host computer. A disadvantage of contemporary approaches is the reliance on the quality of the training data and the static nature of the training data. If the training data does not reflect the current file usage of the application, the container will crash or malfunction without the required container content. Example embodiments of the present invention provide technical solutions to the above noted disadvantages of existing solutions by starting the execution of a workload using a small subset of the container image and then allowing all or a portion of the rest of the container image to be downloaded to the host machine in the background. If it turns out that a portion of the container image required for executing the workload was not included in the subset, there is a good chance that the required portion will be downloaded to the host in a background mode prior to encountering a fault and thus, encountering the fault will not cause the container to crash or malfunction.

Another disadvantage of some contemporary approaches is that the granularity of control is at the package level, which is less efficient than the file level, which in turn is less efficient than the data block level. Example embodiments of the present invention provide technical solutions to the above noted disadvantages of existing solutions by allowing control at the file level or at the data block level.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
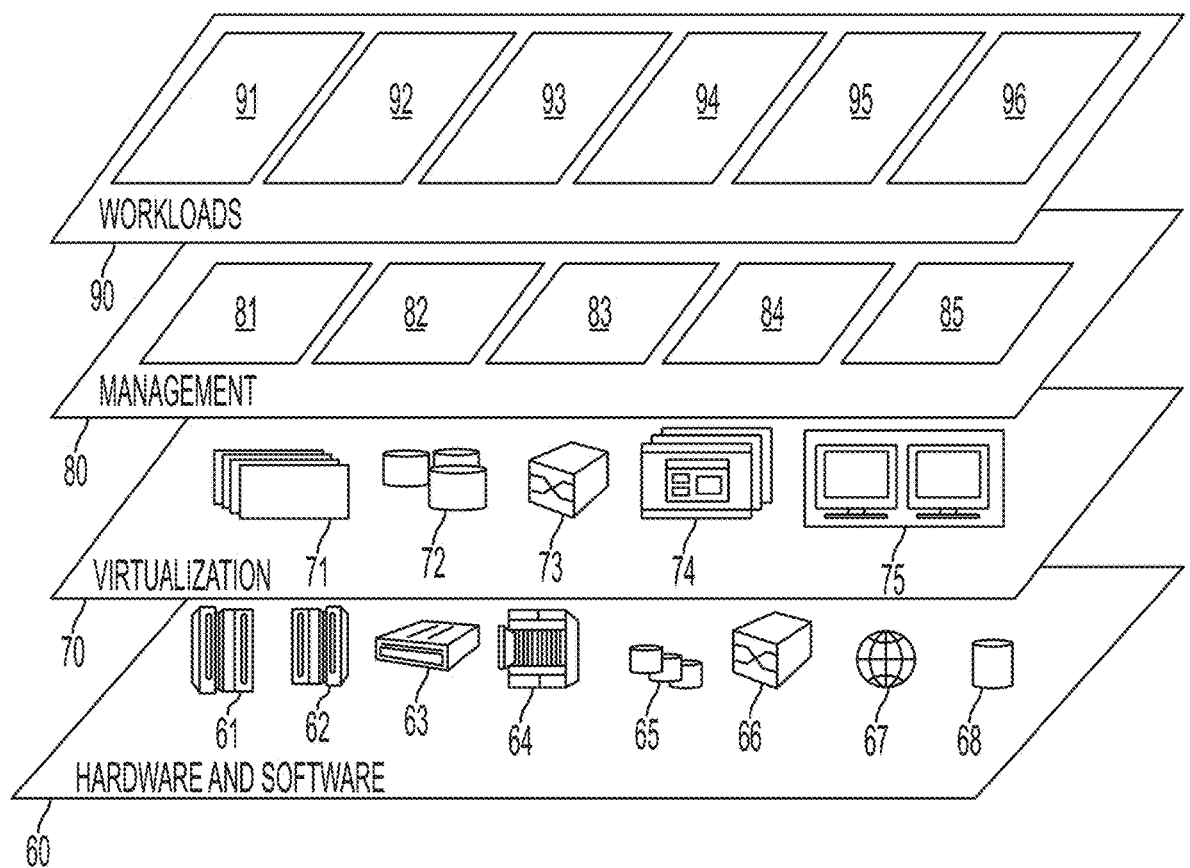
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating and starting fast-start container images 96.

Figure 3:
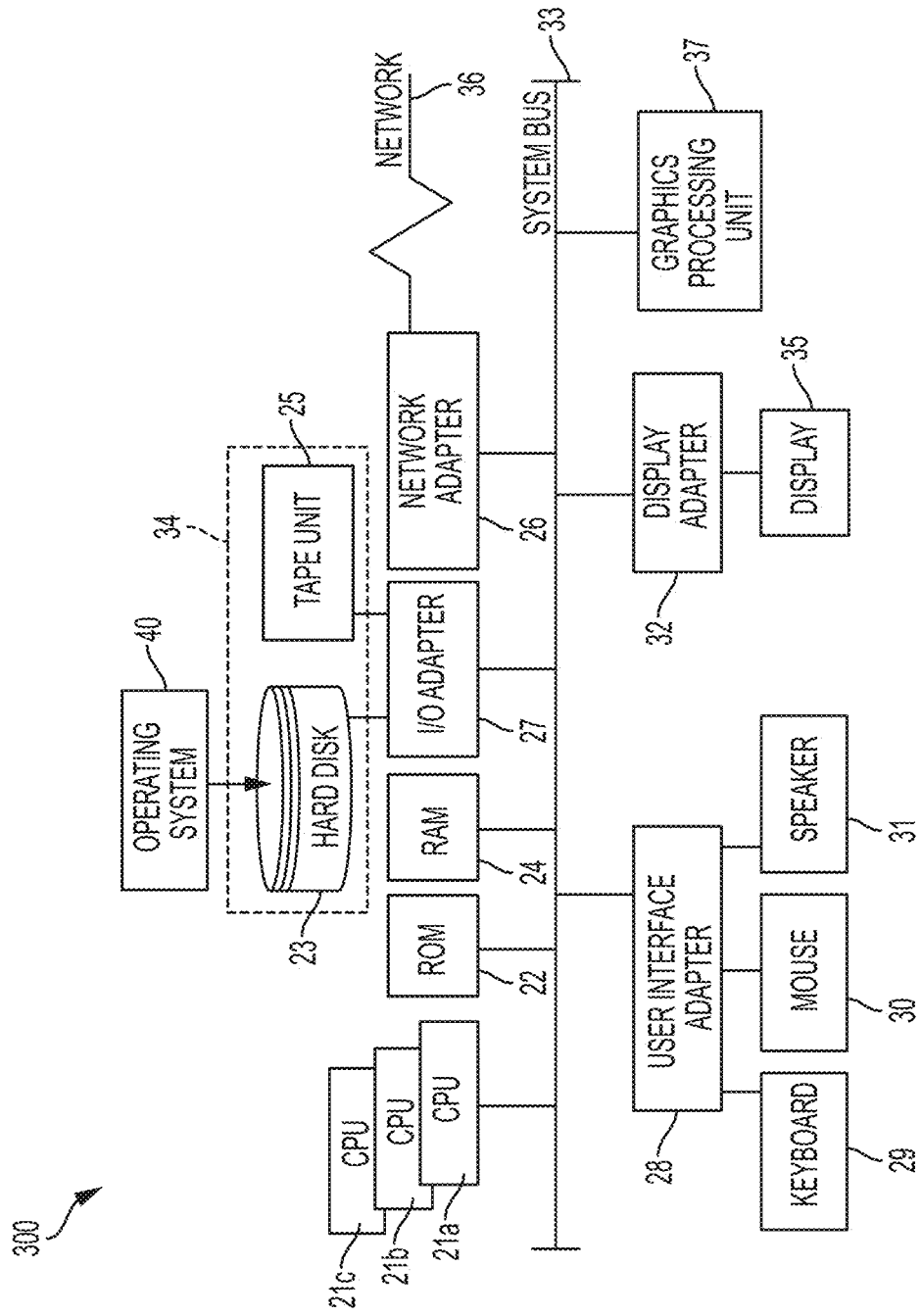
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage drive 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Figure 4:
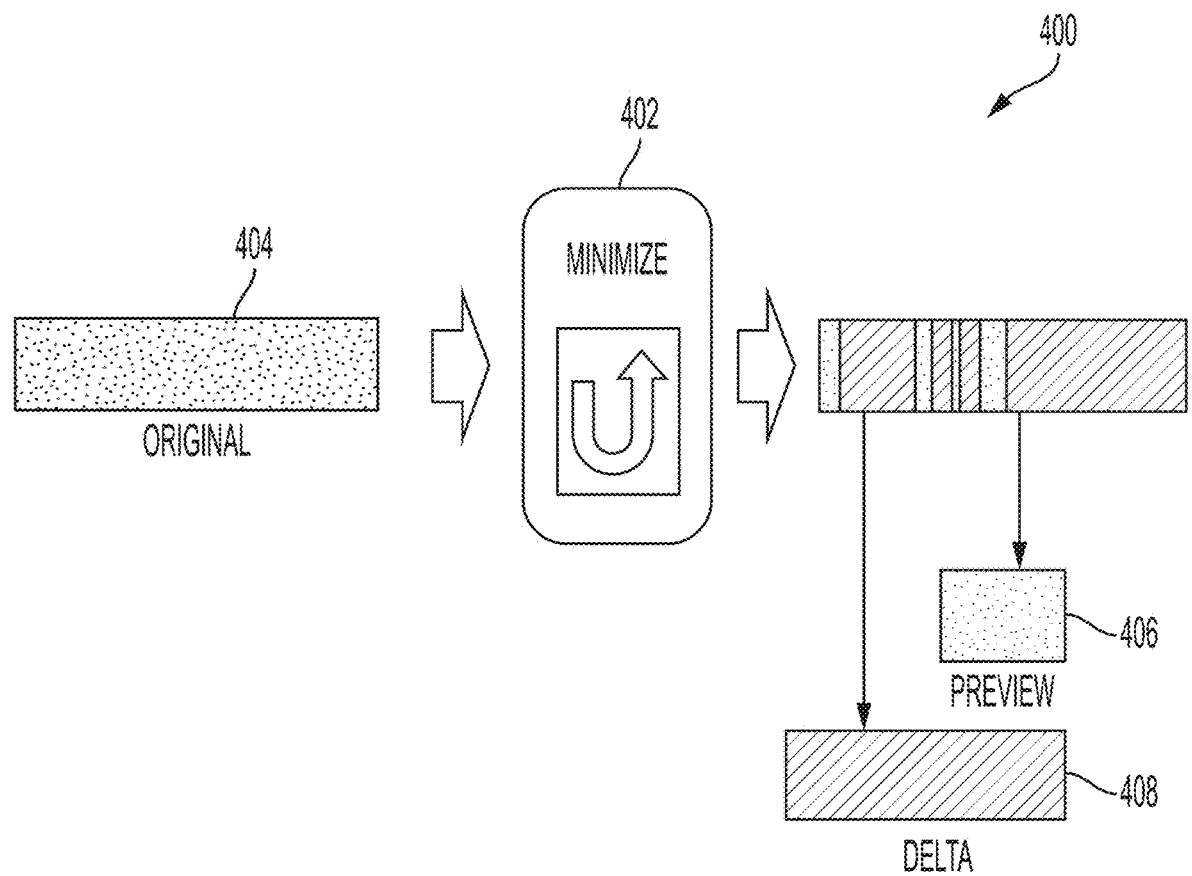
FIG. 4 depicts a block diagram of a system for creating fast-start container images according to one or more embodiments of the present invention.

Turning now to FIG. 4, a block diagram of a system 400 for creating fast-start container images is generally shown according to one or more embodiments of the present invention. As shown in FIG. 4, an original image 404 is input to an image minimizer 402 to reduce the size of the image that will be sent to a host computer for executing a workload. The image minimizer 402 determines the portion, or subset, of original image 404 to include in preview image 406. The portion of the original image 404 not included in the preview image 406 is delta image 408. The combination of the delta image 408 and the preview image 406 is the original image 404. In an embodiment of the invention, the image minimizer 402 determines contents of the preview image 406 by performing package usage analysis including but not limited to executing user defined functions and performing tracing (e.g., inotify, ptrace, etc.) to determine portions of the original image 404 that are utilized by the application when executing a workload. The image minimizer 402 can use known techniques such as, but not limited to: static analysis; dynamic, or run-time, analysis of varying workloads; and package dependency resolution mechanisms. In accordance with one or more embodiments of the present invention, all or a portion of the image minimizer 402 functions are performed by a person to exclude certain features of an application.

In accordance with one or more embodiments of the present invention, the analysis is performed by using a file system block analysis that is performed by the image minimizer 402 by determining which blocks in the original image 404 were accessed during execution of selected user defined functions. When block analysis is performed, the blocks that were accessed are included in the preview image 406 and the blocks that were not accessed are included in the delta image 408.

In accordance with one or more embodiments of the present invention, the image minimizer 402 performs a file analysis by determining which files in the original image 404 were accessed during execution of user defined functions. When file analysis is performed, the files that were accessed are included in the preview image 406 and the files that were not accessed are included in the delta image 408.

In accordance with one or more embodiments of the present invention, the preview image 406 and the delta image 408 are stored in a repository of container images and linked together as being portions of the original image 404.

The original image 404 can be physically stored in the repository or it can be recreated by combining the preview image 406 and the delta image 408. In accordance with one or more embodiments of the present invention, only the original image 404 and the preview image 406 are stored in the repository. In accordance with one or more other embodiments of the present invention, only the delta image 408 and the preview image 406 are stored in the repository.

Figure 5:
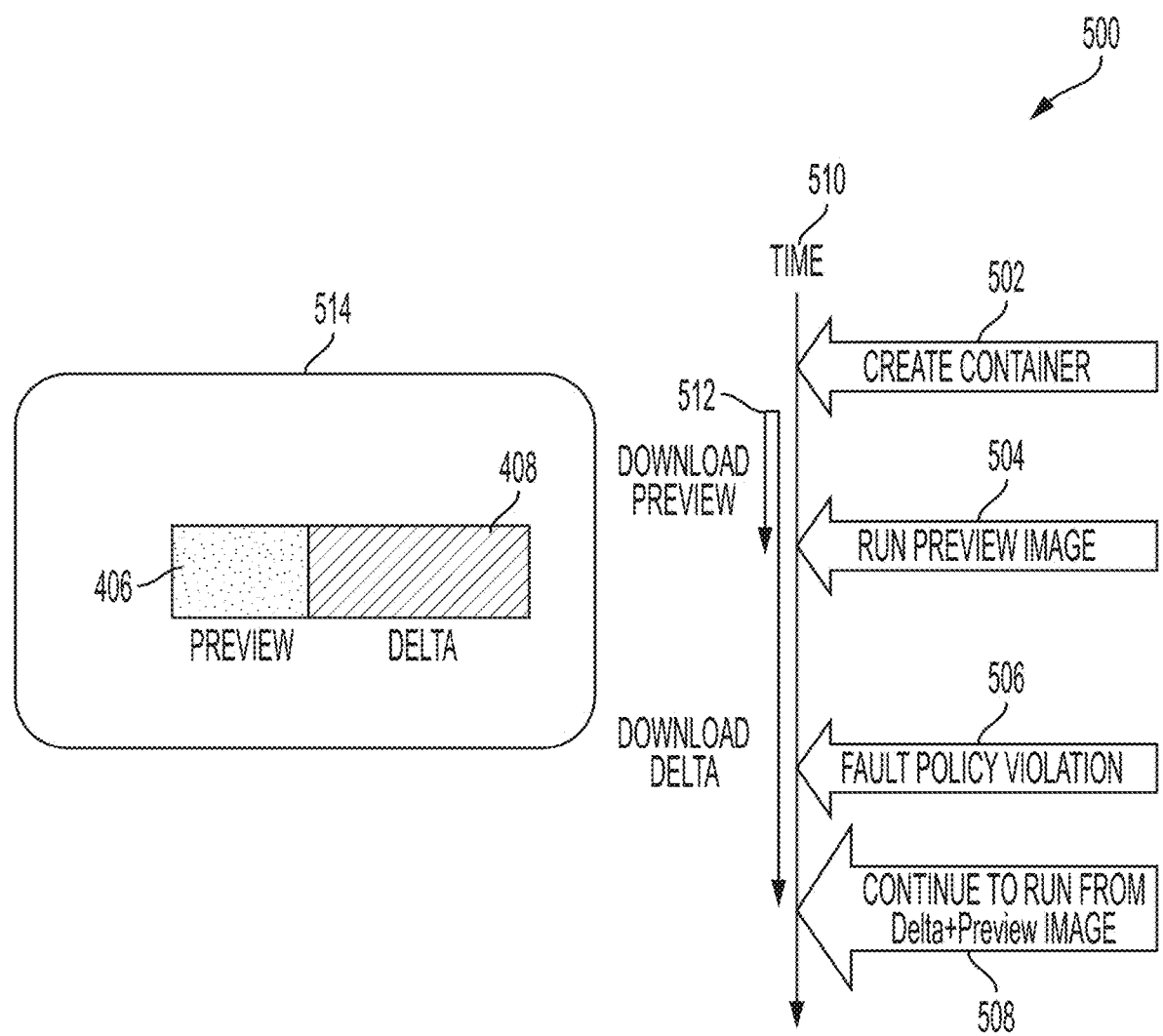
FIG. 5 depicts a block diagram of a system for starting fast-start container images according to one or more embodiments of the present invention.

Turning now to FIG. 5, a block diagram of a system 500 for starting fast-start container images is generally shown according to one or more embodiments of the present invention. As shown in FIG. 5, a preview image 406 and a delta image 408 for original image 404 are stored in an image repository 514. In one or more other embodiments of the present invention, the preview image 406 and original image 404 are stored in the image repository 514. FIG. 5 includes a timeline 510 of events occurring at a host computer, such as host computer 606 of FIG. 6. At time 502, the host computer is instructed to create a container based on the original image 404 to execute a workload. In the embodiment shown in FIG. 5, at time 512 a download of both the preview image 406 and the delta image 408 to the host computer are initiated, or started. At time 504, after the preview image 406 has completed being downloaded to, or has been received at, the host computer, the preview image 406 is executed on the host system for the workload. As shown in FIG. 5, the delta image 408 continues being downloaded in a background mode while the preview image 406 is executing.

At time 506, a fault policy violation is encountered during the executing of the preview image 406. The fault policy violation can include, but is not limited to the container encountering errors, or crashing, more than a specified number of times (e.g., one, five, ten); and/or the application indicating a particular error. In accordance with one or more embodiments of the present invention, a fault handler of the container run-time code is invoked to retrieve the portion of the original image 404 that is required by the workload being executed by the preview image 406. This can include accessing the entire delta image 408 or just the specific file or block in the delta image 408 that is required by the workload. As shown in the embodiment of FIG. 5, the entire delta image 408 is accessed and at time 508, the workload continues to execute on the combination of the delta image 408 and the preview image 406 (i.e., the original image 404).

In accordance with one or more embodiments of the present invention, the fault handler determines what portion of the original image is missing from the preview image 406 and causing the fault. The fault handler can determine whether the portion that is missing from the preview image 406 is stored on the host machine by inspecting the image data (e.g., all or a portion of the delta image 408 or original image 404 download so far) download to the host machine in the background mode. If the missing portion is stored on the host machine, then it can be accessed and used to execute the workload. If the missing portion is not stored on the host machine, then the fault handler can wait until the missing portion is downloaded in the delta image 408. The fault handler can wait to continue execution of the workload until the entire delta image 408 is downloaded or it can continue execution of the workload once the missing portion (e.g., block, page, file) is downloaded to the host machine. In accordance with one or more alternate embodiment of the present invention, the fault handler waits to continue execution of the workload until the entire original image 404 is downloaded. In another alternate embodiment where the entire original image 404 is downloaded, the fault handler can continue execution of the workload once the missing portion (e.g., block, page, file) is downloaded to the host machine.

In accordance with one or more embodiments of the present invention, if an access to a missing file or block is detected, the container is temporarily stopped, the original image 404 is pulled from the image repository 514 (in embodiments where the entire original image 404 is downloaded in the background mode), and the container is restarted using the original image 404. In accordance with one or more embodiments of the present invention, if an access to a missing file or block is detected, the container is paused, the missing file or block is requested from the image repository 514, and the container resumes. In accordance with one or more embodiments of the present invention, after a specified number of faults, the original image 404 is retrieved from the image repository 514.

Figure 6:
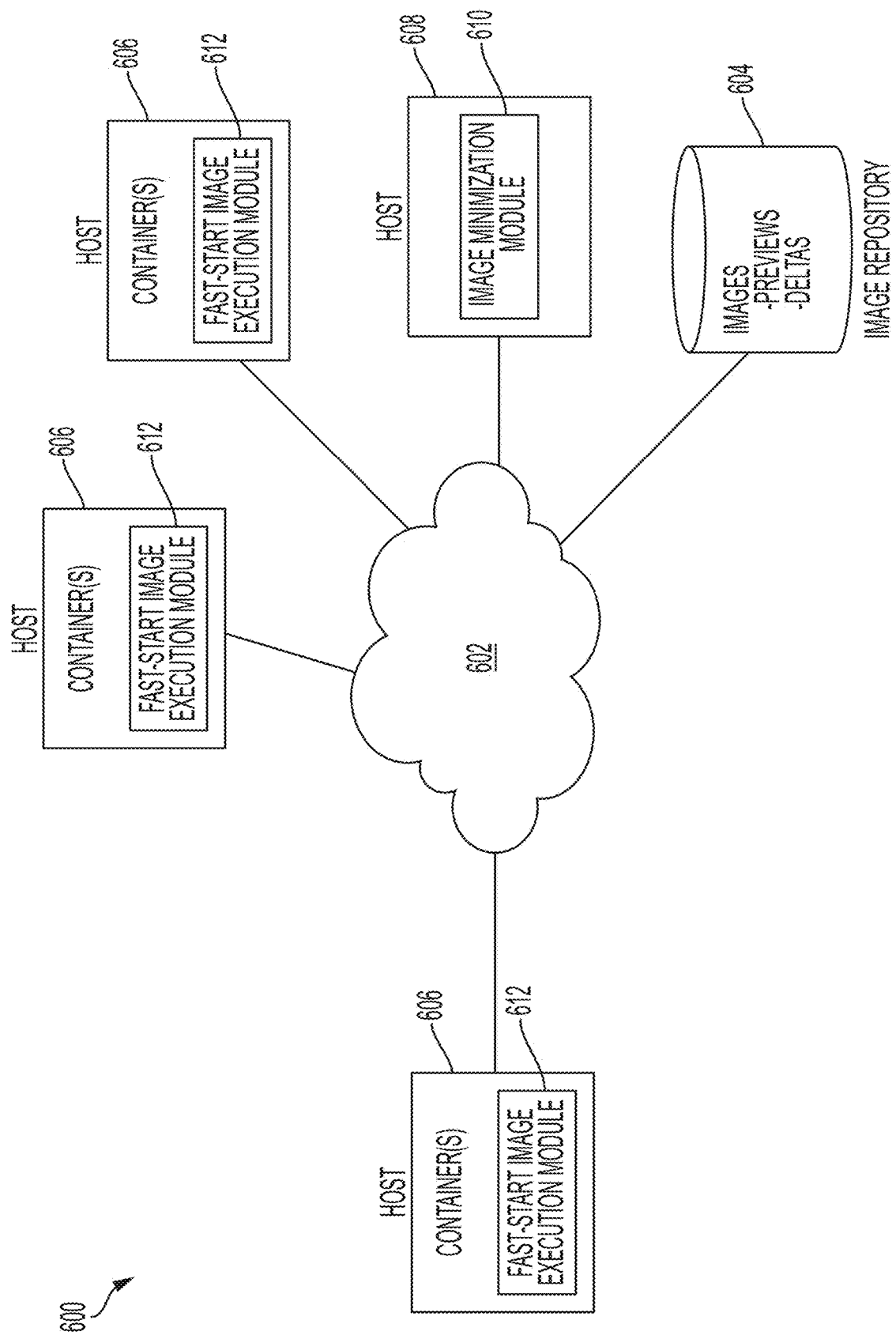
FIG. 6 depicts a block diagram of a system for creating and starting fast-start container images according to one or more embodiments of the present invention.

Turning now to FIG. 6, a block diagram of a system 600 for creating and starting fast-start container images is generally shown according to one or more embodiments of the present invention. At least a subset of the components of system 600 may be implemented by one or more cloud computing nodes 10 and local computing devices 54A-N of FIG. 1. FIG. 6 shows three host computers 606 that are executing containers and fast-start image execution modules 612, and one host computer 608 that is executing an image minimizing module 610. In accordance with one or more embodiments of the present invention, the image minimizing module 610 is executed on one or more of host computers 606. Though not shown, each host computer 606 can also include a processor, local storage for storing container images, and container infrastructure code such as, but not limited to an OS and container runtime code. In one or more embodiments of the present invention, the image minimizing module 610 performs all or a subset of the processing described above with reference to FIG. 4, and the fast-start image execution module 612 performs all or a subset of the processing described above with respect to FIG. 5.

FIG. 6 also includes an image repository 604 for storing container images including preview and delta images. In one or more embodiments of the present invention, the image repository 604 stores for each image, an original image and a preview image. In one or more embodiments of the present invention, the image repository 604 stores for each image, an original image, a delta image, and a preview image. In one or more embodiments of the present invention, as shown in FIG. 6, the image repository 604 stores for each image, a delta image and a preview image. The image repository 604 can be implemented by any database or data storage method known in the art, such as but not limited to a relational database and a data file system. As shown in FIG. 6, the host computers 606 608 and the image repository 604 are in communication via a network 602 which may be part of a cloud computing environment such as cloud computing environment 50 of FIG. 1.

Figure 7:
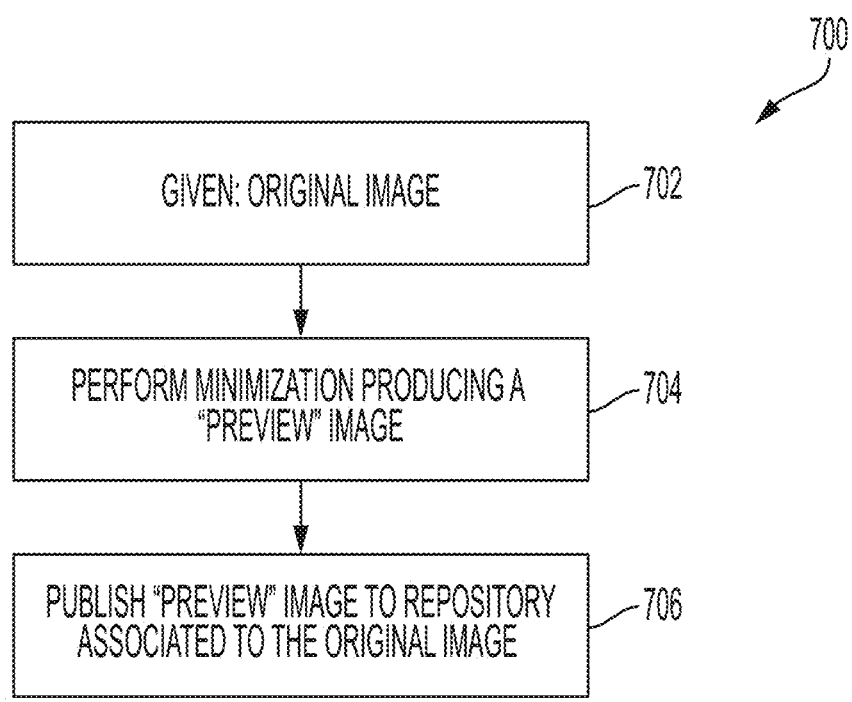
FIG. 7 depicts a flow diagram of a process for creating fast-start container images according to one or more embodiments of the present invention.

Turning now to FIG. 7, a flow diagram of a process 700 for creating fast-start container images is generally shown according to one or more embodiments of the present invention. In accordance with one or more embodiments of the present invention, the processing shown in FIG. 7 is performed by image minimizing code, such as image minimizing module 610 of FIG. 6. The image minimizing code can be implemented by program instructions executable by a processor included, for example on host computer 608 of FIG. 6. At block 702, an original image is received by the image minimizing code and at block 704 a minimization process is performed to produce a preview image of the original image. At block 706, the preview image is stored in an image repository, such as image repository 604 of FIG. 6, and associated with the original image.

Figure 8:
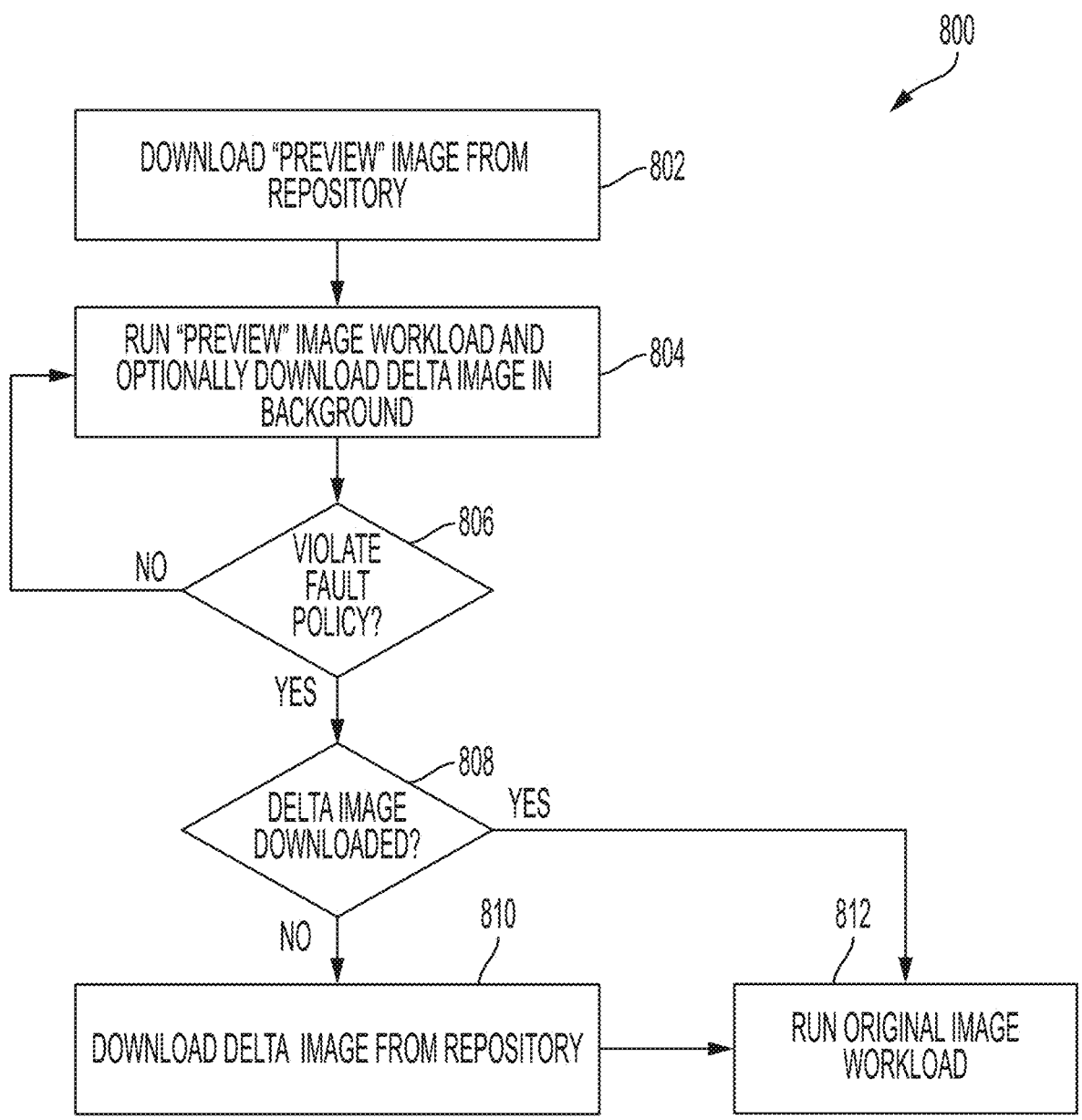
FIG. 8 depicts a flow diagram of a process for starting fast-start container images according to one or more embodiments of the present invention.

Turning now to FIG. 8, a flow diagram of a process 800 for starting fast-start container images is generally shown according to one or more embodiments of the present invention. In accordance with one or more embodiments of the present invention, the processing shown in FIG. 8 is performed by fast-start container image execution code, such as fast-start image execution module 612 of FIG. 6. The fast-start image execution code can be implemented by program instructions executable by a processor included, for example on host computer 606 of FIG. 6. At block 802, a preview image is downloaded to a host computer, such as host computer 606, from an image repository, such as image repository 604 of FIG. 6. At block 804, the preview image repository is executed on the host computer to execute a workload.

Optionally, at block 804, a download of a delta image that corresponds to the preview image is initiated in a background mode. The decision on whether to download the delta image (or any portion of the delta image) can be based on the likelihood that the execution of the preview image will enter a fault status. For example, if the preview image has been executing workloads for a threshold amount of time (e.g., one day, one week, one month) with less than a threshold number of faults, then the delta image may not be downloaded. This can result in a network bandwidth savings. In another embodiment of the present invention, the decision about whether to download the delta file is based at least in part on a number of times (five, ten) or percentage of times (two percent, five percent, ten percent) that a fault has been encountered in a specified number (one hundred, one thousand, ten thousand) of previous executions of the preview image. By not downloading at least a portion of the original image of the container not included in the preview image to the host computer, the portion is received and stored at the host computer after a fault has been detected during execution of the preview image of the container.

In one or more other embodiments of the present invention, when it is determined that the download should occur, a download of the entire delta image or a download of a selected subset of the delta image is initiated in a background mode. The selected subset can be based on a portion of the original image having a next highest (when compared to the content of the preview image) likelihood of being accessed by the workload being executed.

At block 806, it is determined whether a fault policy has been violated. If it is determined that a fault policy has not been violated, then processing continues at block 804 with executing the preview image for executing the workload. If it is determined at block 806 that a fault policy has been violated, then processing continues at block 808 with determining whether the delta image of the container has been downloaded to the host computer. If the delta image of the container has been downloaded to the host computer, then block 812 is performed and the original image (i.e., the combination of the preview image and the delta image) is executed for the workload. If it is determined at block 808 that the delta image of the container has not been downloaded (and downloading has not been initiated) to the host computer, then block 810 is performed to download the delta image from the repository. Processing continues at block 812 when it is determined that the delta image has been downloaded.

In accordance with one or more embodiments of the present invention, if the delta image has started being downloaded but has not completed, the fast-start image execution code waits for the downloading to complete. In accordance with one or more embodiments of the present invention, it is determined at block 808 whether the specific portion of the original image required to correct the fault has been downloaded and stored at the host computer. If the specific portion required to correct the fault has been downloaded, then processing continues at block 812.

In accordance with one or more embodiments of the present invention, the processing described in reference to FIG. 8 is performed with the original image being optionally downloaded to the host computer at block 804 instead of the delta image.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, at a host computer, a preview image of a container, the preview image comprising a subset of an original image of the container;
   executing, at the host computer, the preview image of the container for a workload;
   receiving in a background mode, at the host computer, subsequent to receiving the preview image of the container, a portion of the original image of the container that does not include the subset of the original image of the container included in the preview image, wherein the portion combined with the subset is the original image; and
   based at least in part on detecting a fault during the executing of the preview image of the container, accessing, for continuing execution of the workload, the portion of the original image of the container that does not include the subset of the original image of the container included in the preview image of the container.

2. The computer-implemented method of claim 1, wherein the preview image comprises a subset of functions included in the original image of the container.

3. The computer-implemented method of claim 1, wherein the preview image is created based at least in part on a file system block analysis.

4. The computer-implemented method of claim 1, wherein the preview image is created based at least in part on a package usage analysis.

5. The computer-implemented method of claim 1, wherein the preview image is created based at least in part on a run-time analysis of varying workloads.

6. A system comprising:
   a memory having computer readable instructions; and
   one or more processors for executing the computer readable instructions, the computer readable instructions controlling the one or more processors to perform operations comprising:
   receiving, at a host computer, a preview image of a container, the preview image comprising a subset of an original image of the container;
   executing, at the host computer, the preview image of the container for a workload;
   receiving in a background mode, at the host computer, subsequent to receiving the preview image of the container a portion of the original image of the container that does not include the subset of the original image of the container included in the preview image, wherein the portion combined with the subset is the original image; and
   based at least in part on detecting a fault during the executing of the preview image of the container, accessing, for continuing execution of the workload, the portion of the original image of the container that does not include the subset of the original image of the container included in the preview image of the container.

7. The system of claim 6, wherein the preview image comprises a subset of functions included in the original image of the container.

8. The system of claim 6, wherein the preview image is created based at least in part on a file system block analysis.

9. The system of claim 6, wherein the preview image is created using a package usage analysis.

10. The system of claim 6, wherein the preview image is created based at least in part on a run-time analysis of varying workloads.

11. A computer program product comprising a computer readable storage medium having program instructions embodied therewith, the program instructions executable by a processor to cause the processor to perform operations comprising:
   receiving, at a host computer, a preview image of a container, the preview image comprising a subset of an original image of the container;
   executing, at the host computer, the preview image of the container for a workload;
   receiving in a background mode, at the host computer, subsequent to receiving the preview image of the container a portion of the original image of the container that does not include the subset of the original image of the container included in the preview image, wherein the portion combined with the subset is the original image; and
   based at least in part on detecting a fault during the executing of the preview image of the container, accessing, for continuing execution of the workload, the portion of the original image of the container that does not include the subset of the original image of the container included in the preview image of the container.

12. The computer program product of claim 11, wherein the preview image comprises a subset of functions included in the original image of the container.

13. The computer program product of claim 11, wherein the preview image is created based at least in part on one of a file system block analysis and a package usage analysis.

14. The computer program product of claim 11, wherein the preview image is created based at least in part on a run-time analysis of varying workloads.

* * * * *